United States Patent [19]
Parsons

[11] Patent Number: 5,596,791
[45] Date of Patent: Jan. 28, 1997

[54] ROPE CLAMP

[76] Inventor: Llewellyn B. Parsons, 113 Cook Street Unit #3, Barrie, Ontario, Canada, L4M 4G5

[21] Appl. No.: 623,806

[22] Filed: Mar. 29, 1996

[51] Int. Cl.⁶ .................................................. A44B 21/00
[52] U.S. Cl. .......................... 24/130; 24/115 R; 24/131 C
[58] Field of Search ........................... 24/115, 130, 131 C

[56]  References Cited

U.S. PATENT DOCUMENTS

| | | | |
|---|---|---|---|
| 3,343,809 | 9/1967 | Newell | 24/130 |
| 4,143,446 | 3/1979 | Down | 24/115 R |
| 4,236,281 | 12/1980 | Bottum | 24/115 R |
| 4,340,998 | 7/1982 | Liberge | 24/130 |
| 4,455,717 | 6/1984 | Gray | 24/115 R |
| 4,930,193 | 6/1990 | Baker | 24/130 X |
| 5,283,930 | 2/1994 | Krauss | 24/130 X |
| 5,339,498 | 8/1994 | Parsons | 24/130 X |
| 5,522,120 | 6/1996 | Brinning | 24/130 |

Primary Examiner—Peter M. Cuomo
Assistant Examiner—Stephen Vu
Attorney, Agent, or Firm—Jane Parsons

[57] ABSTRACT

A rope clamp is provided in the form of a hook to hang on a rail, ring or other object such as a ledge. The hook may be injection moulded plastics material. Rope is lodged in a channel around the hook. The channel is wider at its mouth than at its base so that rope may be wedged or clamped in the narrow part of the channel. Guides are provided for rope entering the channel and for rope leaving the channel to bias it into the narrow part of the channel. The rope may be easily manually moved into the wider part of the channel to allow adjustment of the rope on the clamp.

7 Claims, 3 Drawing Sheets

ROPE CLAMP

RELATED APPLICATIONS

This application completes and claims benefit from Provisional Patent Application No. 60/001,625 filed on Jul. 28, 1995, in the name of the same inventor.

BACKGROUND OF THE INVENTION

1. Field of the Invention

The invention relates to a rope clamp in the form of a hook which may be hung on a horizontal rail, ring or fixed hook, to clamp a bight of rope firmly.

2. Acknowledgement of Prior Art

When an object is suspended by a rope attached to a rail, ring, etc., it is usual to tie the rope to the support so that the object is suspended at the desired height. In many case it is necessary to make a number of attempts to tie the rope such that the object is suspended at exactly the right height. For some purposes, it may be desired to adjust the length of rope between the object and the knot quite frequently. For each adjustment various attempts may be made since it is not easy to gauge the exact amount of slack in the rope.

One example of a situation where frequent adjustments of height are required is that of boat fenders. Boat fenders are often suspended from a horizontal rail of a boat to dangle against the side of the boat so as to protect the side of the boat from damage when approaching a dock or other structure. Frequently the fenders will be untied and brought inboard when not required for use.

SUMMARY OF THE INVENTION

The present invention provides an easy to use rope clamp in the form of a hook which may be used to suspend objects on a rope and which may be hooked onto a support such as a rail, ring or other support object. The rope clamp of the invention provides quick release means whereby grip of the rope clamp may be released for adjustment of the height of the suspended object.

According to the invention a rope clamp comprises an open hook for hanging on a support, the hook having a forward opening for accessing the support, the hook comprising a pair of parallel walls forming:

an arch having a free forward end adjacent said opening, and a lower body portion depending from the arched portion;

the arch comprising a channel for rope between said parallel walls, the channel being open exteriorly of a curve of the arch and closed interiorly of the curve of the arch by a base wall connecting said parallel walls;

the lower portion comprising an entry guide to direct rope entering said channel at the free forward end of the arch to bias a bight of said rope towards said base wall; and an exit guide to direct rope exiting from said channel forwardly to additionally bias said bight of rope towards said base wall;

wedges being provided between inner surfaces of the parallel walls to grip the rope.

The lower portion may comprise a body portion merging with the arch, and in which said entry guide comprises a vertical cylindrical open ended channel for rope between the parallel walls and located below and spaced below said free forward end of the arch.

The exit guide may comprise a slot for rope across on of said parallel walls from back to front. Conveniently the slot slopes downwardly from back to front. Rope in the channel of the hook emerges from the channel at the lower back of the arch and may be manually pulled forward to lodge it in the slot of the exit guide. This action biases the rope in the channel forwardly towards the base wall and helps to lodge it firmly between the gripping wedges. To unclamp the rope it may be removed from the slot and pulled rearwardly away from the wedge.

The exit guide may comprise a short, vertical open ended U-channel for rope, extending downwardly from a front end of said slot.

The wedges may be symmetrically arranged in pairs on inner surfaces of both parallel walls, each pair forming a progressively narrowing gripping or clamping region for rope. Conveniently four pairs of wedges are provided.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
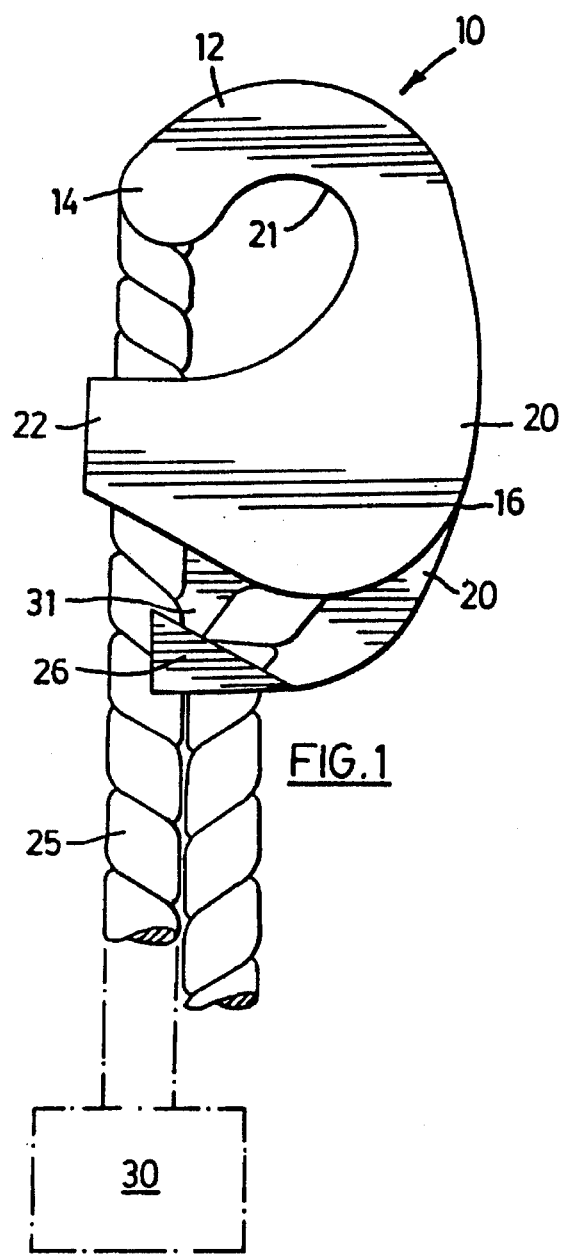
FIG. 1 illustrates a hook rope clamp according to the invention in clamped position.

The drawings show a rope clamp 10 of generally open hook shaped configuration and including an upper hook portion 12 in the form of an arch. The rope clamp 10 may comprise a pair of parallel walls 20 joined by a base wall 21 to form a U-shaped channel 18 open to the exterior of the curve about the arch 12. The whole unit may be injection molded from resilient plastics material such as polyethylene, polypropylene, polyvinylchloride, etc. The arch 12 has a free end 14 and another end merging into a lower portion 16. The generally parallel walls 20 extend into lower portion 16.

The open channel 18 between the parallel walls 20 opens at the end 14 and widens into the region between the parallel walls 20 of the lower portion 16.

Lower portion 16 extends downwardly and laterally below arch 12. At a front part it is provided with a first rope guide extension 22 for guiding an entry bight of rope 23 into channel 18 at free end 14 of arch 12. The guide extension 22 has a vertical tubular guide passage 24 through it. First rope guide extension 22 is so arranged that guide passage 24 is generally aligned with channel 18 at end 14 of arch 12. The diameter of channel 18 and the width of passage 24 may be generally similar and is selected to hold rope of various diameters slidably within the guide passage 24 and channel 18 respectively.

A second rope guide extension 26 is located on body portion 16 to bias an exit bight of rope 25 forwardly. Rope guide extension 26 may comprise any lug, hook or ledge etc positioned forwardly of the bach of arch 12. As illustrated, however, rope guide extension 26 comprises an open vertical channel 28 parallel to and rearward of passage 24 of first rope guide 22. Channel 28 opens forwardly and may have similar width to that of channel 18 and the diameter of passage 24.

An open ended slot 31 is provided in one of the side walls 20 from the lower rear part of arch 12 to the tope of channel 28. Slot 31 has a width to allow insertion of the thickness of the rope. Slot 31 preferably slopes downwardly towards the top of channel 28 but it may be horizontal. The bight of rope 23 is led forwardly in slot 31 and passed into and downwardly through channel 28.

In operation a fender 30 or other suspended object is attached to one end of bight of rope 25. Bight 25 passes vertically through passage 24 in extension 22 and then around the arch 12 in channel 18 and thence through the lower portion 16 between side walls 20. The exiting bight of rope 23 is pulled forward through slot 31 to lie in channel 28. Thus, due to the location of bights 23 and 25, a middle bight 32 of rope tends to tighten about arch 12 towards its rear within channel 18. Gripping or clamping wedges 27 are provided to narrow the channel 18 towards the base wall 21 to grip the rope.

Figure 3:
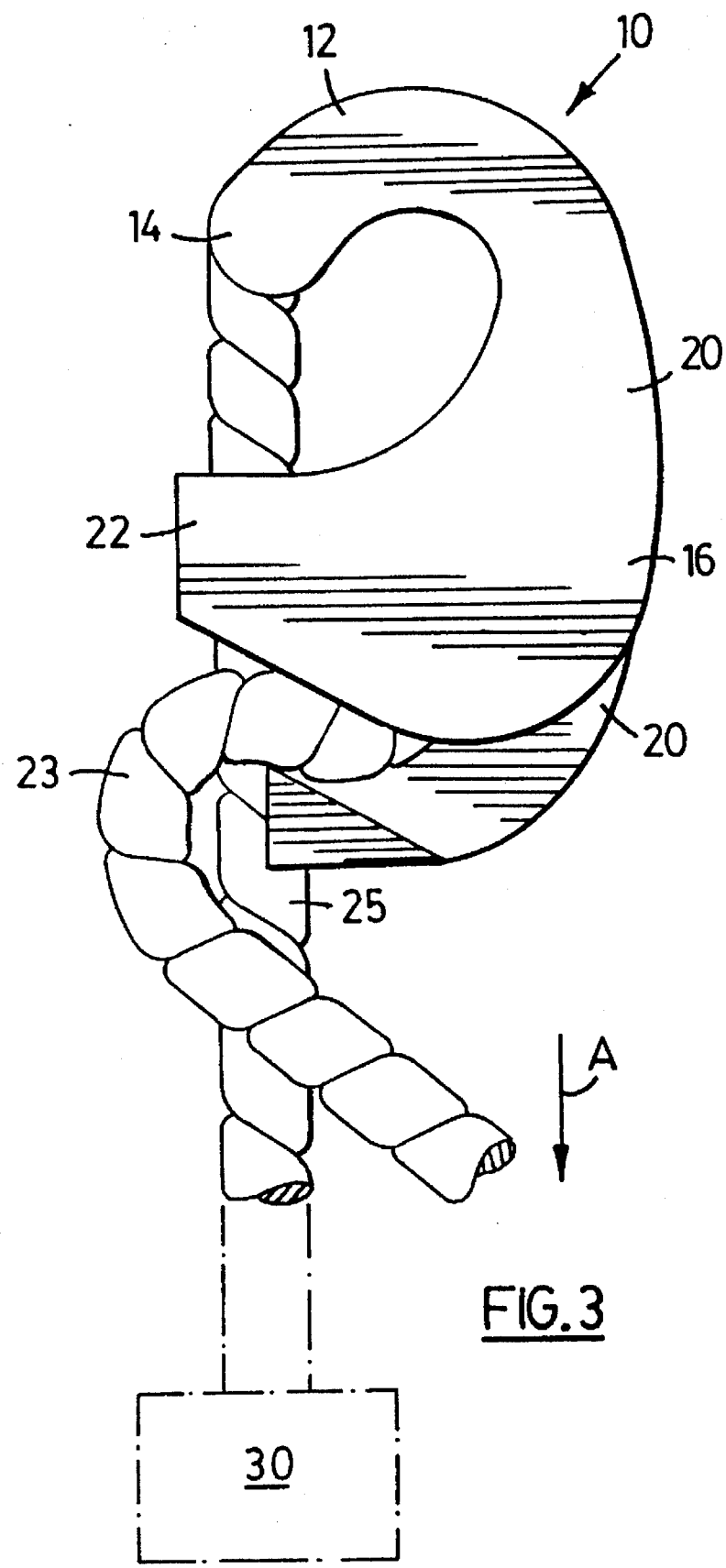
FIG. 3 shows the rope clamp of FIGS. 1 and 2 with rope positioned mid-way between clamped and loose positions.
Figure 9:
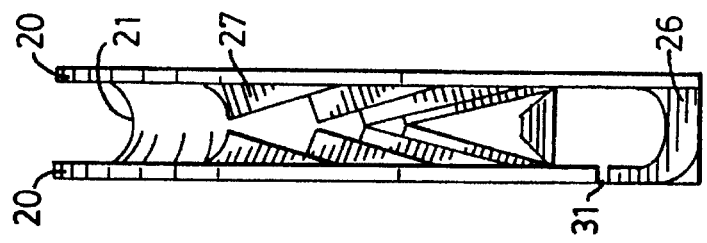
FIG. 9 shows the rope clamp of FIG. 8 without rope in order to show the gripping wedges.
Figure 8:
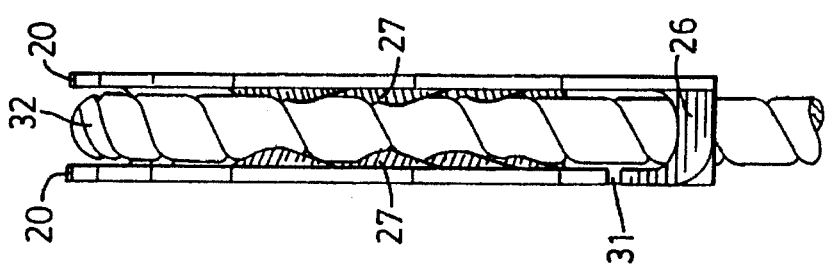
FIG. 8 shows the rope clamp of the previous Figure from the back with rope clamped therein.
Figure 6:
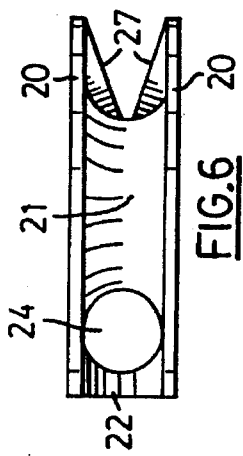
FIG. 6 shows the rope clamp of the previous Figures from the top (without rope)
Figure 7:
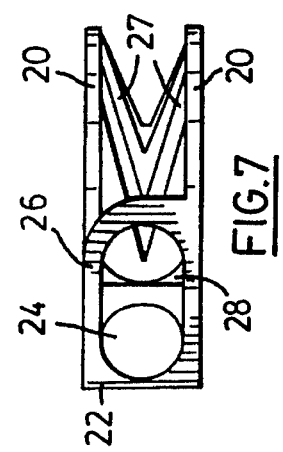
FIG. 7 shows the rope clamp of the previous Figures from the bottom (without rope)
Figure 5:
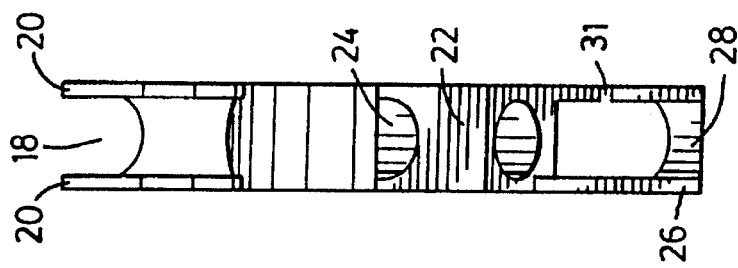
FIG. 5 is a view similar to that of FIG. 4 but without rope.
Figure 4:
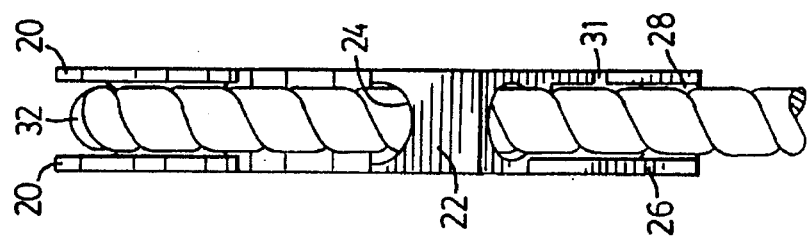
FIG. 4 shows the rope clamp of FIG. 1 with rope clamped therein from the front.

In order to tighten the rope in the clamping jaws by moving it further into the narrow region between them and to force them resiliently further apart to exert greater clamping force, it may be released from channel 28 by pulling it forward (see FIG. 3) so that it lies in slot 31. If the rope is now pulled downwardly in the direction of arrow A (see FIG. 3) it will be tightened in between clamping wedges 27.

Figure 2:
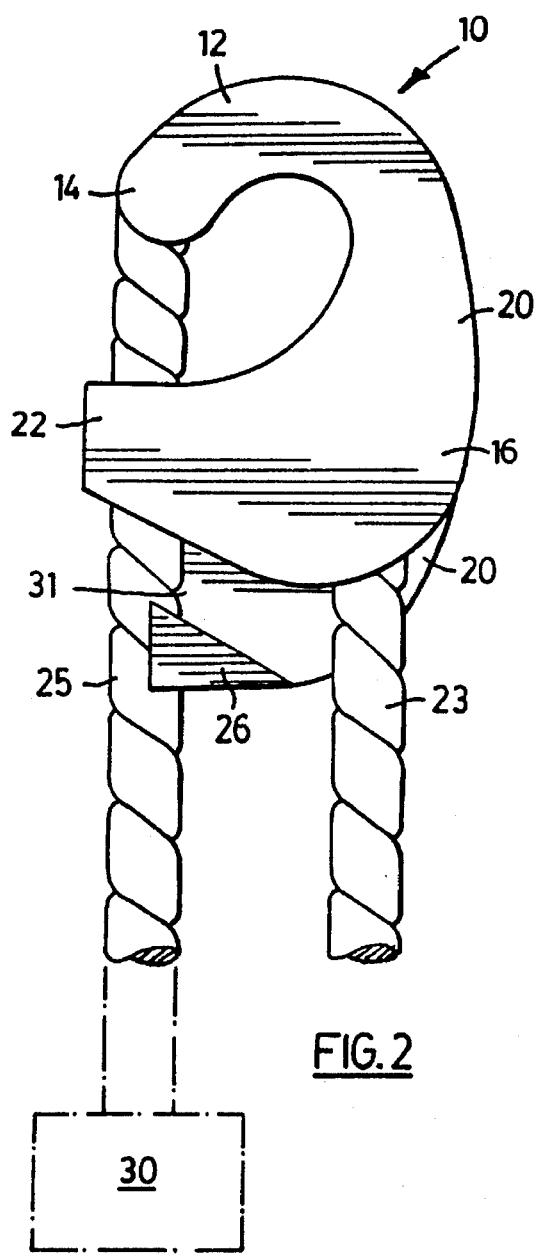
FIG. 2 shows the rope clamp of FIG. 1 with rope loosely positioned in it.

To release the rope in the clamping wedges 27 it may be pulled forward out of channel 28 and then moved rearwardly in slot 31 until it reaches the rearmost portion of the slot where the grip of clamping wedges 27 will be released. (see FIG. 2). In this position the rope will be free from all restraints but will be guided in channel 18 and unless tension is kept on the rope, fender 30 would drop under its own weight.

The wedges 27 may be angled to the vertical so that it is possible to draw rope through the clamp 10 in one direction but not in the other. For example, if a pair of wedges narrow the channel 18 between them so that the wider part of the channel is lower than the narrowed part rope may be pulled through clamping wedges 27 to raise fender 30 even when the rope is configured in channel 28 as shown in FIG. 1. Depending on the angle between clamping wedges 27 and the configuration of parallel walls 20 of lower portion 16, fender 30 will remain in position when no further pressure is exerted to pull rope downwardly through channel 28. If fender 30 is unduly heavy or the friction exerted by clamping wedges 27 is insufficient, the end of rope 30 may be released from channel 28 and the rope may be pulled forwardly in slot 31 to further fix the rope in clamping wedges 27. The rope may then be returned to channel 28 to guard against repositioning.

Conveniently four pairs of symmetrical wedges 27 are provided and they may conveniently be set at an angle of say 45° to the vertical so that the widest point between each pair is appreciably lower then the narrowed point. The wedges 27 themselves may widen from a point at any convenient angle. This angle should be small to encourage squeezing or clamping the between pairs of wedges. A suitable angle at which the wedges may widen is 10°. They need not widen laterally and vertically at similar angles. For example each wedge may widen at 7° in the vertical plane but 10° in the lateral plane.

The internal curve of hook 12 may conveniently be provided with a liner to provide grip with the rail on which it is to be hung. The liner may be gum rubber.

The device may be useful with rails of 1 inch or ⅞ of an inch. It is, however, possible to provide hooks to fit other rail shapes.

I claim:

1. A rope clamp shaped as an open hook for hanging on a support and having a forward opening for accessing the support and comprising a pair of parallel walls forming:

an arch having a free forward end adjacent said opening, and a body depending from the arch and merging with the arch;

the arch comprising a ropeway between said parallel walls, the ropeway being open exteriorly of a curve of the arch and closed interiorly of the curve of the arch by a base wall connecting said parallel walls;

the body comprising a rope entry guide comprising a vertical cylindrical open ended rope guide located between the parallel walls below and spaced below said free forward end of the arch to bias a rope towards said base wall;

an exit rope guide downstream of said ropeway and positioned forwardly and below said ropeway to additionally bias a rope towards said base wall; and rope gripping wedges provided between inner surfaces of the parallel walls.

2. A rope clamp as claimed in claim 1 in which said exit guide comprises a slot for a rope across one of said parallel walls.

3. A rope clamp as claimed in claim 2 in which said exit guide additionally comprises a short, vertical open ended U-channel for a rope, the U-channel extending downwardly from a front end of said slot.

4. A rope clamp as claimed in claim 1 in which said wedges are symmetrically arranged in pairs on said inner surfaces of both said parallel walls, said pairs forming a progressively narrowing gripping region for a rope.

5. A rope clamp as claimed in claim 4 in which four said pairs of wedges are provided.

6. A rope clamp as claimed in claim 4 in which each of said pair of wedges rises as it forms the progressively narrowing gripping region for a rope.

7. A hooked rope clamp in combination with a curve for hanging on a support having a forward opening for accessing a support, comprising a pair of parallel walls forming:

an arch having a free forward end adjacent said opening, and a body depending from the arch and merging with the arch;

the arch comprising a ropeway between the parallel walls having a bight of said rope located in the ropeway, the ropeway being open exteriorly of the curve of the arch and closed interiorly of the curve of the arch by a base wall connecting the parallel walls;

the body comprising a rope entry guide having an upstream part of said bight of said rope located in the entry guide and a vertical cylindrical open ended rope guide located between said parallel walls below and spaced below said free forward end of the arch to bias said upstream part of said bight of said rope towards said base wall;

an exit rope guide downstream of said ropeway having a downstream part of said bight of said rope located in the exit rope guide, the exit rope guide being positioned forwardly and below the ropeway to additionally bias said downstream part of said bight of said rope towards said base wall; and rope gripping wedges being provided between inner surfaces of the parallel walls to grip the rope.

* * * * *

UNITED STATES PATENT AND TRADEMARK OFFICE
CERTIFICATE OF CORRECTION

PATENT NO. : 5,596,791
DATED : January 28, 1997
INVENTOR(S) : Llewellyn Bertram Parsons It is certified that error appears in the above-identified patent and that said Letters Patent is hereby corrected as shown below:

On the title page,

Insert "Related U.S. Application Data"

item (60) Provisional Application: 60/001,625
Filed: July 29, 1997

Signed and Sealed this

Sixth Day of July, 1999

Attest:

Q. TODD DICKINSON

Attesting Officer

Acting Commissioner of Patents and Trademarks